United States Patent
Wu et al.

[11] Patent Number: 6,141,134
[45] Date of Patent: Oct. 31, 2000

[54] MULTIPLE-RESOLUTION OPTICAL DEVICE

[75] Inventors: Chen-i Wu; Feng-shen Lee, both of Hsinchu, Taiwan

[73] Assignee: Mustek Systems Inc., Hsin-Chu, Taiwan

[21] Appl. No.: 09/220,823

[22] Filed: Dec. 24, 1998

[51] Int. Cl.[7] .................................................. G02B 26/08
[52] U.S. Cl. ........................ 359/210; 359/209; 359/196; 355/55; 355/56; 355/57; 355/60; 399/151
[58] Field of Search .................................. 359/210, 209, 359/196; 355/55, 56, 57, 60; 399/151

[56] References Cited

U.S. PATENT DOCUMENTS

| | | | |
|---|---|---|---|
| 5,579,146 | 11/1996 | Hsiao | 359/196 |
| 5,845,019 | 12/1998 | Yoshizawa | 382/312 |

*Primary Examiner*—Cassandra Spyrou
*Assistant Examiner*—Leo Boutsikaris
*Attorney, Agent, or Firm*—Ladas & Parry

[57] ABSTRACT

A multiple-resolution optical device used to scan objects of variable sizes in various resolutions and forming corresponding images onto an image sensor is disclosed. The multiple-resolution optical device according to the present invention comprises a light source, a mirror set, and a lens set. The mirror set reflects the light from the light source projected onto the object and provides a plurality of optical paths. The lens set selects one of the optical paths to provide an object distance and an image distance whereby the corresponding image is clearly formed on the image sensor in response to said size. Hence, an optimal resolution is acquired and the optical resolution for optical scan processing is substantially enhanced.

6 Claims, 1 Drawing Sheet

MULTIPLE-RESOLUTION OPTICAL DEVICE

BACKGROUND OF THE INVENTION

1. Field of the Invention

This invention relates to an optical scanning technology. In particular, it relates to an optical device capable of providing multiple-resolutions for copiers, facsimiles, and scanners, among others. Upon optical scanning, optimal optical resolution is provided for different sizes of objects to be scanned, thereby enhancing the optical resolution upon processing and further enhancing the image quality.

2. Description of the Related Art

Office products such as copiers, facsimiles, and scanners already play a vital role in this modern hustling and bustling society. Copiers duplicate text pages or image objects and enable knowledge to be rapidly distributed; facsimiles transmit text pages or image objects through telephone lines to a remote location without the lengthy delay of postal delivery; scanners convert text pages or image objects into an electronic file for easy transmission or storage. However, these products all require a pre-scanning of the text or image objects.

The optical path and the focus position of the lens are fixed in the optical processing devices built into currently available copiers, facsimiles, and scanners. Therefore, in optical scanning, the maximal optical resolution is determined and fails to adjust relative to the size of the objects. Software applications use interpolation to increase dots per inch (dpi) for a finer touch of the image. However, such software applications for increasing dpi only improve the image after magnification and do not really enhance optical resolution.

A method of providing variable resolutions for scanners, facsimiles and copiers has been disclosed in the Taiwanese Patent Publication No. 281851. In said method, a variable resolution is provided through a charge-coupled device and a position change of the zoom lens. However, this method provides for any change of resolution; it is not limited to common sizes such as A4, B4 and B5. Such a continuum of possible resolutions is unnecessary, and because it requires two driving motors for respectively driving the charge-coupled device and the zoom lens, the manufacturing cost and thus the retail price for consumers is increased. In addition, the need to simultaneously adjust the charge-coupling device and zoom lens complicates the focusing procedure.

Accordingly, an object of the invention is to provide a multiple-resolution optical device that renders through a movement of lenses the optimal optical resolution for various sizes of objects to be scanned.

Another object of the invention is to provide a multiple-resolution optical device capable of enhancing both the optical resolution during optical processing and the image quality.

The aforementioned objects of this invention can be achieved by providing a multiple-resolution optical device used to scan objects of variable sizes in various resolutions and form corresponding images onto an image sensor. The multiple-resolution optical device according to the present invention comprises a light source, a mirror set, and a lens set. The mirror set reflects the light source projected onto the object and provides a plurality of optical paths. The lens set selects one of the optical paths to provide an object distance and an image distance whereby the corresponding image is clearly formed on the image sensor in response to said size. Hence, an optimal resolution is acquired and the optical resolution for the optical scan processing is substantially enhanced.

BRIEF DESCRIPTION OF THE DRAWING

The aforementioned objects, features and advantages of this invention will become apparent by referring to the following detailed description of a preferred embodiment with reference to the accompanying drawings, wherein.

DESCRIPTION OF THE PREFERRED EMBODIMENT

The multiple-resolution optical device of this invention provides various optical paths for objects of various sizes to be scanned, allowing various optical resolutions in accordance with a position change in the movement of the lens and the change of the reflection path through the mirror sets. This invention will further be described in detail with reference to the accompanying drawings.

Figure 1:
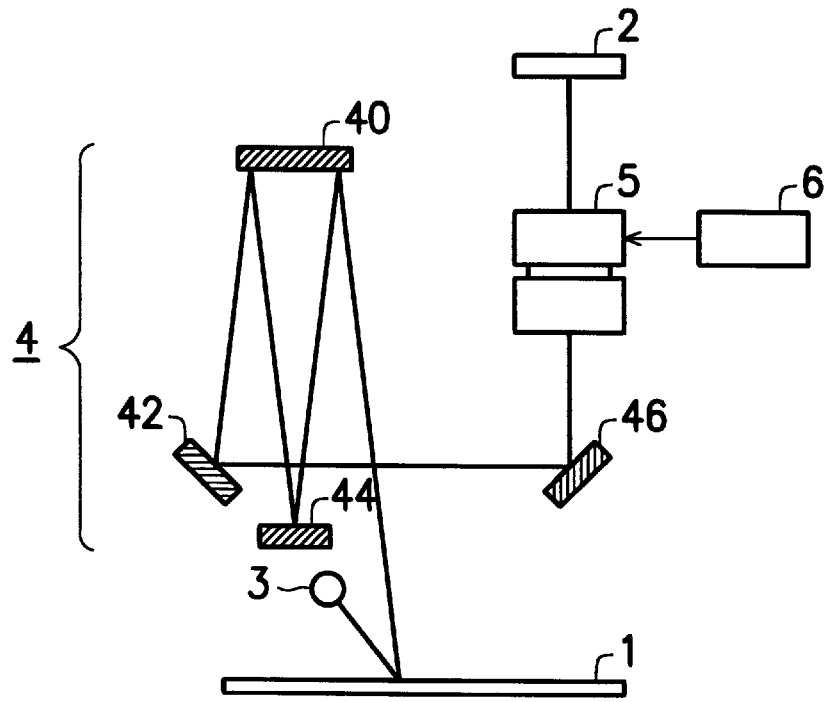
FIG. 1 is a diagram illustrating the position of one preferred embodiment of the invention when applied to an object of a larger size.
Figure 2:
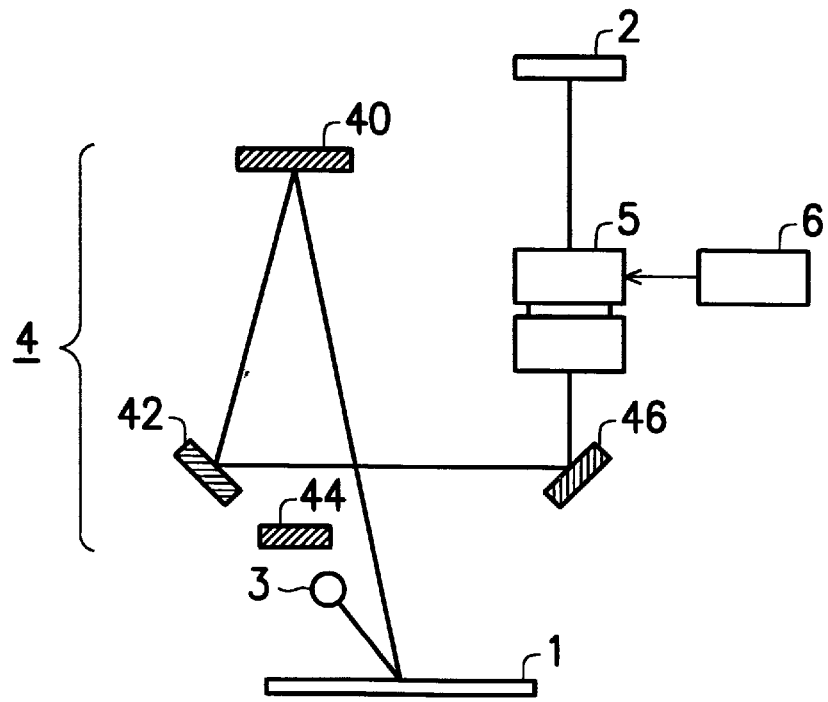
FIG. 2 is a diagram illustrating the position of one preferred embodiment of the invention when applied to an object of a smaller size.

Refer to FIGS. 1 and 2, diagrams respectively illustrating the position of one preferred embodiment of the invention when applied to an object of a larger size and the position of one preferred embodiment of the invention when applied to an object of a smaller size. A multiple-resolution optical device in accordance with the invention forms an image of the object 1 onto an image sensor 2. The object 1 can be a flat document of text, graphics, or a combination of both, while the image sensor 2 may, for example, comprise several charge-coupled devices.

As shown in FIGS. 1 and 2, a multiple-resolution optical device of the invention comprises a light source 3, a mirror set 4, a lens set 5, and a driving motor 6. As shown in the drawing, the mirror set 4 is composed of four mirrors 40, 42, 44, and 46. Four mirrors are exemplified in this embodiment; however, this should not be used to limit the scope of the invention. Lens set 5 can be either a fixed-focus lens or zoom lens, and thus the invention is fairly flexible in terms of application.

According to the invention, light from the light source 3 projecting the object 1 is scattered onto the mirror set 4 and reflected by the mirror set 4. The mirror set 4 provides a plurality of reflection paths by means of mirrors 40, 42, 44 and 46, and therefore creates an image with a plurality of optical paths. Next, according to the size of the object 1, the driving motor 6 moves the lens set 5, adjusts the position of the lens set 5, and provides the image sensor 2 with the object distance and image distance whereby the image is clearly formed. In other words, the magnification power of the image of the object 1 onto the image sensor 2 is adjusted.

Referring to FIG. 1, a diagram illustrates the position of one preferred embodiment of the invention when applied to an object of a larger size. The object 1 can be, for example, of size A4 (210×297 mm). Light from the light source 3 projects the object 1 and is scattered onto the mirror set 4, reflected next by the mirror set 4 (as shown in the figure), and further reflected sequentially by mirrors 40, 42, 40, 44, and 46. In other words, according to the size of object 1 and the reflection path selected through mirrors 44, 40, 42, and 46, an optical path is provided for the object 1 on the lens set 5. Then, the driving motor 6 moves the lens set 5, adjusts the position of the lens set 5, and provides the image sensor 2 with the object distance and image distance whereby the image is clearly formed. That is, the magnification power of the image of the object 1 onto the image sensor 2 is adjusted. If at this time the magnification power on the image sensor 2 is one and the resolution of the image sensor 1 is 300 dpi, then the current optical resolution is 300 dpi.

Referring to FIG. 2, a diagram illustrates the position of one preferred embodiment of the invention when applied to an object of a smaller size. The object 1 can be, for example, of size B5 (176×250 mm). Light from the light source 3 projects the object 1 and is scattered onto the mirror set 4, reflected next by the mirror set 4 (as shown in the figure), and further reflected sequentially by mirror 40, 42, and 46. In other words, according to the size of object 1 and the reflection path selected through mirrors 42 and 46, an optical path is provided for the object 1 on the lens set 5. Then, the driving motor 6 moves the lens set 5, adjusts the position of the lens set 5, and provides the image sensor 2 with the object distance and image distance whereby the image is clearly formed. That is, the magnification power of the image of the object 1 onto the image sensor 2 is adjusted. In this case, the image on the image sensor 2 is magnified approximately to the size A4, so the magnification power of image to the object 1 is 1.15. If at this time the resolution of the image sensor 1 is still 300 dpi, then the current optical resolution can be increased to approximately 345 dpi. Similarly, the smaller the size of the object 1, the higher the resolution.

In summary, according to the invention, light from the light source 3 projecting the object 1 is scattered onto the mirror set 4 and reflected by the mirror set 4. The mirror set 4 provides multiple reflection paths with mirrors 40, 42, 44 and 46, and therefore creates an image with plural optical paths. Next, according to the size of the object 1, the driving motor 6 moves the lens set 5, adjusts the position of the lens set 5, and provides the image sensor 2 with the object distance and image distance whereby the image is clearly formed. In other words, variable optical paths are provided through the variation of reflection path of the mirror set 4 and the movement of the lens 5.

Consequently, the movement of the lens position provides variable optical paths for various sizes of image of an object on the image sensor. Further, the optical resolution upon optical processing is actually enhanced, as is the image quality.

Although the present invention has been described in its preferred embodiments, it is not intended to limit the invention to the precise embodiments disclosed herein. Those who are skilled in this technology can make various alterations and modifications without departing from the scope and spirit of this invention. Therefore, the scope of the present invention shall be defined and protected by the following claims and their equivalents.

What is claimed is:

1. A multiple-resolution optical device for scanning objects of variable sizes in various resolutions and forming corresponding images onto an image sensor, said multiple-resolution optical device comprising:

a light source projecting said object;

a mirror set, fixed at a certain position, for reflecting light from said light source projected onto said object and providing a plurality of optical paths; and a lens set which is moved along its optical axis to select one of said optical axis one of said optical paths to provide an object distance and an image distance where a corresponding image is clearly formed on said image sensor in response to an object of a certain size.

2. The multiple-resolution optical devices of claim 1, further comprising a driving motor for moving said lens set.

3. The multiple-resolution optical device of claim 1, wherein said image sensor comprises at least one charge-coupled device.

4. The multiple-resolution optical device of claim 1, wherein said mirror set comprises a plurality of mirrors.

5. The multiple-resolution optical device of claim 1, wherein said lens set is a fixed-focus lens.

6. The multiple-resolution optical device of claim 1, wherein said lens set is a zoom lens.

\* \* \* \* \*